United States Patent
van Aardt et al.

(10) Patent No.: US 8,226,798 B2
(45) Date of Patent: Jul. 24, 2012

(54) METHOD OF CONVERTING PYROLYZABLE ORGANIC MATERIALS TO BIOCARBON

(75) Inventors: Hendrik van Aardt, Johannesburg (ZA); Phil Marsh, Prince George (CA); Hugh McLaughlin, Groton, MA (US)

(73) Assignee: Alterna Energy Inc., Prince George (CA)

( * ) Notice: Subject to any disclaimer, the term of this patent is extended or adjusted under 35 U.S.C. 154(b) by 668 days.

(21) Appl. No.: 12/472,019

(22) Filed: May 26, 2009

(65) Prior Publication Data
US 2010/0300866 A1 Dec. 2, 2010

(51) Int. Cl.
*C10B 33/00* (2006.01)

(52) U.S. Cl. .......... 201/3; 201/21; 201/28; 201/29; 110/345; 585/240

(58) Field of Classification Search .......... 201/3, 21, 201/28, 29; 585/240; 110/345, 224
See application file for complete search history.

(56) References Cited

U.S. PATENT DOCUMENTS

| 3,962,045 | A | | 6/1976 | Douglas et al. |
|---|---|---|---|---|
| 4,145,256 | A | | 3/1979 | Bowen |
| 4,373,995 | A | * | 2/1983 | Bowen et al. ............ 202/95 |
| 4,465,556 | A | * | 8/1984 | Bowen et al. ............ 202/99 |
| 5,435,983 | A | | 7/1995 | Antal, Jr. |
| 5,725,738 | A | * | 3/1998 | Brioni et al. ............ 201/14 |
| 5,882,484 | A | | 3/1999 | Pyy |
| 6,182,584 | B1 | * | 2/2001 | Gaudio ............ 110/229 |
| 6,790,317 | B2 | | 9/2004 | Antal, Jr. |

* cited by examiner

*Primary Examiner* — Nina Bhat
(74) *Attorney, Agent, or Firm* — Rothwell, Figg, Ernst & Manbeck, P.C.

(57) ABSTRACT

A method of forming a pyrolysed biocarbon from a pyrolyzable organic material is delineated. The method involves the conversion of pyrolyzable organic materials to biocarbon for subsequent use. A carbonization circuit is employed with individual feedstock segments being advanced through the circuit. The method facilitates user manipulation of rate of advancement of the feedstock through the circuit, selective collation of volatiles from pyrolyzing feedstock, selective exposure of predetermined feedstock segments to collated volatiles as well as thermal recovery and redistribution as desired by the user. This results in the capacity for a customizable biocarbon product, the latter being an auxiliary feature of the methodology.

20 Claims, 2 Drawing Sheets

METHOD OF CONVERTING PYROLYZABLE ORGANIC MATERIALS TO BIOCARBON

FIELD OF THE INVENTION

The present invention is directed to the thermal modification of pyrolyzable organic materials and more particularly, the present invention is directed to a method for converting biomass in an efficient manner into a high quality biocarbon product.

BACKGROUND OF THE INVENTION

Biocarbon, char, biochar or charcoal is an important compound, since the product has a number of uses, examples of which include fuel and reactant in the refining of metals. Typically, pyrolyzable organic materials are attractive progenitors for biocarbon production. Recently, new uses for biocarbons have become particularly important. One of these is the use of biocarbon for the sequestration of carbon dioxide, a greenhouse gas, and the addition to soils as an amendment to improve soil fertility. There is, given the diversity of product utilizations, a need to have efficient methods for formulating customizable types of biocarbons from pyrolyzable organic materials, such as biomass.

Thermal conversion of organic compounds into derivative substances that contain greater relative portions of carbon is known as pyrolysis or carbonization. It is well known that the formation of the charcoal typically involves the liberation of the volatile organic compounds from pyrolyzable organic materials, in particular, the thermal conversion of lignocellulose material. Depending on the specific thermal conversion process, supplemental thermal energy may be required or excess thermal energy may have to be removed to properly control the thermal conversion.

The addition of thermal energy can be achieved by a number of commonly practiced techniques such as heat exchange or oxidation of available organic matter. A common method of oxidation of available organic matter is to provide a limited source of oxygen, typically in the form of air, to the pyrolyzing organic materials, thereby concurrently oxidizing some of the available organic matter and releasing the associated thermal energy within the remaining solids. The removal of excess thermal energy can also be achieved by both direct and indirect heat exchange, where inert cooler gases are introduced into the vapor phase of the pyrolysing organic matter.

The art has developed substantially over the years and the improvements that are presently known are basically predicated on the Lambiotte retort. The Lambiotte retort is a classical vertical shaft furnace. The basic features include counter-current flow of solids (down) and vapors (up), with addition of air to provide internal heating via partial oxidation of the pyrolyzable organic matter, typically wood. The design is dated; however, the apparatus is efficient at producing large quantities of charcoal at relatively low conversion efficiency of the raw material. The benefits of the system relate to relatively light labour requirements with high mechanical reliability.

Subsequent to the introduction of the Lambiotte retort and the process for operating the retort, numerous other patents have issued directed to improvements in apparatus and methodology to effect the production of the charcoal. As an example, two related U.S. patents include U.S. Pat. No. 5,725,738, issued Mar. 10, 1998 to Brioni et al. and U.S. Pat. No. 5,882,484, issued Mar. 16, 1999 to Pyy. Both feature the method of compartmentalizing the entering pyrolyzable organic materials into totes and progressing the solids sequentially in the totes through the drying and thermal conversion stages.

In U.S. Pat. No. 3,962,045, issued Jun. 8, 1976 to Douglas et al., there is disclosed a pyrolyzing vessel having inlets and outlets for the fuel charged. The pyrolyzing gas passes through the vessel along paths at substantially right angles. The patent also references the fact that effective heat transfer from the gas phase to the solids requires an excessive gas flow to the solids throughput on a weight basis. It is indicated in column 3 at lines 33 et. seq., "a typical maximum gas/refuse rate would be 10:1 by weight, that is to say 10 lbs of gas circulating for every 1 lb of raw refuse pyrolysed". This reference is useful for teaching the fact that vapor travel perpendicular to the direction of the solids movement allows for a lower pressure drop by having a shorter path through the bed of solids.

In respect of further developments in the art, in U.S. Pat. No. 5,435,983, issued Jul. 25, 1995, to Antal, there is disclosed a biocarbon producing method. The process establishes the merits of using controlled combustion as a source of heat. In the reference, heat is provided by both oxidation of air in the reactor and external heating. In contrast, in Antal's later patent, U.S. Pat. No. 6,790,317, issued Sep. 14, 2004, the same basic reactor is operated in a mode where the reactor is pressurized and the bottom of the biomass is ignited, then additional air supplied to sustain the partial combustion processes to generate the necessary heat for the conversion of biomass charge to charcoal. In comparative examples 5 and 6 of this reference, Antal establishes the lower energy requirement of his "reverse burn" approach and the absence of any appreciable loss of yield. Antal further establishes that the temperature range of between 400° C. and 600° C. for the highest temperature measured in the reactor, which is a lower range of temperature experienced in earlier processes where the char is heated to higher temperatures, often above 1000° C. Although significant features are taught in the references, a disadvantage of this patentee's approach relates to the batch mode of operation and the high cost of providing a pressurized reactor controlling a non-steady state process. In the literature, Antal establishes that his process does not create a homogenous product with the material at the bottom, middle and top of the reactor having physical and chemical property variations that cannot be eliminated (*Ind. Eng. Chem. Res.* 2003, 42, 3690-3699 and *Ind. Eng. Chem. Res.* 2006, 45, 585-599).

Additional improvements in the overall processing of charcoal are further recognized in Ind. Eng. Chem. Res. 2003, 42, 1619-1640, where Antal discussed the following:

"Vapor-Phase Residence Time. Although Klason and established the key role of secondary (vapor-phase) pyrolytic reactions in the formation of charcoal 88 years ago; today on, many researchers still assume that the charcoal is solely a product of primary (solid-phase) pyrolytic reactions. In reality, charcoal contains both "primary" charcoal and "secondary" charcoal that is a coke derived from the decomposition of the organic vapors ("tars") onto the solid carbonaceous solid. This decomposition is probably catalyzed by the charcoal."

The importance of secondary charcoal formation appears in U.S. Pat. No. 4,145,256, issued Mar. 20, 1979 to Bowen, where it is described in the abstract: "At the same time, a temperature gradient is established in the reaction zone which will allow some of the vapor component of the decomposition (i.e. heavier tars) to condense on the solid component at cooler regions for subsequent reintroduction into the high temperature regions so that the latent carbon content of these tars may also be recovered. The throughput or residence time of the material through the reaction zone and the amount of air introduced (to control the maximum reaction temperature as well as the temperature gradient) are controlled in related manner to recover more or less of the heavier tar residue."

The actual reactor configuration of U.S. Pat. No. 4,145,256 is a basic counter-current flow, with the vapors travelling up through the bed of descending solids, as found in the Lambiotte retort. As such, the extent of control over the recovery of heavier tars and the flexibility of controlling the temperature profile within the bed by controlling the amount of air injected were limited. However, U.S. Pat. No. 4,145,256 does place an appropriate emphasis on the value of secondary charcoal formation from heavier tars and the importance of providing suitable control over the temperature profile during the conversion of the entering pyrolyzable organic materials into a high quality biocarbon product.

SUMMARY OF THE INVENTION

One object of one embodiment of the present invention is to provide an improved method for formulating pyrolyzable organic materials, such as biomass.

A further object of one embodiment of the present invention is to provide a method for combining drying and cooling operations with thermal energy recovery in a pyrolyzing process, comprising the steps of: providing a carbonizer circuit having a drying stage, pyrolyzing stage and cooling stage, the pyrolyzing stage including: pyrolyzing organic materials to generate biocarbon and exhaust gas containing combustible volatiles and tars; combining at least a portion of the exhaust gas with air to form a combustible mixture; igniting the mixture to form a purified hot gas stream; the drying stage including: circulating at least a portion of the purified hot gas stream into direct contact with the entering pyrolyzable organic materials to augment drying of the pyrolyzable organic materials and generating a high humidity dryer exhaust stream; condensing a portion of the high humidity dryer exhaust stream by heat removal; the cooling stage including: providing condensate from the dryer stage to the cooling stage; and introducing the condensate into the cooling stage in a manner to cool hot biocarbon sufficiently to allow safe discharge from the carbonizer circuit.

Yet another object of one embodiment of the present invention is to provide a method of forming a pyrolysed biocarbon, comprising: providing a carbonizer circuit for thermal modification of pyrolyzable organic materials, the carbonizer circuit having a pyrolyzing stage therein; pyrolyzing advancing predetermined feedstock segments where a gradient of pyrolyzing feedstock is generated and liberates a vapor mixture containing at least combustible volatiles and tars; and recirculating, in the pyrolyzing stage, the vapor mixture at predetermined feedstock segments within the pyrolyzing stage for at least one of thermal energy exchange and formation of secondary charcoal from the vapor mixture to the predetermined segments.

Yet another object of one embodiment of the present invention is to provide a method of forming a homogenous pyrolysed product, comprising: providing a carbonizer circuit for thermal modification of pyrolyzable organic materials, the carbonizer circuit having a pyrolyzing stage therein for transforming the entering pyrolyzable organic materials into thermally modified biocarbon; advancing dried feedstock in individual segments through the pyrolyzing stage; thermally modifying advancing dried feedstock segments where a gradient of pyrolysed feedstock is generated from the individual segments, each segment having a discrete vapor mixture containing at least volatiles and tars, each the discrete vapor mixture having a discrete temperature range; collating each the vapor mixture into one or more vapor mixtures; providing thermal control of the collated vapor mixtures to form uniform streams at desired temperatures by heat exchange or selectively introducing air into the vapor mixtures to facilitate oxidation of at least some of the advancing feedstock and concurrent generation of heat therein; recirculating, in the pyrolyzing stage, the uniform stream at predetermined feedstock segments within the carbonizer circuit for exposure to the predetermined segments, whereby each the predetermined segment is exposed to the uniform stream to form a homogeneous product.

In the prior art, the benefit of recirculating the vapor mixture was overlooked as is evidenced is U.S. Pat. No. 5,725,738. In this reference, all vapors liberated in the pyrolysis zone were extracted thus resulting in the requirement for additional heating as well as circumventing advantageous exposure of the biocarbon to the vapor for secondary charcoal formation.

With respect to U.S. Pat. No. 5,882,484, heat recovery was realized for recirculation from the biocarbon exiting the pyrolyzing zone to the incoming feedstock, however the importance of the vapor recirculation practice was unrecognized.

By practicing the instant method, the significance of thermal and chemical conservation has been not only appreciated, but also elegantly managed to result in an efficient protocol maximizing vapor contact with the feedstock advancing through the pyrolyzing stage. The recirculation of the vapor and control of the composition thereof has a widespread benefit to the efficiency of the method and the biocarbon quality.

A concomitant advantage to the method is realized in that the reaction kinetics of the method can be controlled by the designer. The rate at which the vapor is recirculated to the individual portions of pyrolyzing organic materials can be controlled and manipulated, which inherently reduces the gradient of conversion within individual organic portions. Such control substantially reduces thermal and chemical inconsistencies between feedstock segments, manifesting in a more homogeneous biocarbon product.

The function of the carbonizer is to convert pyrolyzable organic materials, including lignocellulosic biomass, into biocarbon. Biocarbon, however, is a general term for a range of materials that has several variable properties. In addition to efficiency-of-conversion metrics, such as electrical energy requirements and the yield of biocarbon per unit of incoming pyrolyzable organic materials, the present methodology permits the designer to selectively alter the biocarbon properties by manipulating operating conditions within the separate stages of the carbonizer circuit. These intrinsic biocarbon properties include fuel density (Btu/pound or other units of energy per unit mass), fixed carbon and volatile matter content, and the extent that the biocarbon has activated carbon-like adsorption properties, termed "native adsorption capacity".

Having thus generally described the invention, reference will be made to the accompanying drawings illustrating preferred embodiments.

BRIEF DESCRIPTION OF THE DRAWINGS

Similar numerals employed in the Figures denote similar elements.

DETAILED DESCRIPTION OF THE PREFERRED EMBODIMENTS

As a general introduction, the pyrolyzable organic material, such as biomass, that is carbonized in the instant process is typically transported in segments, also referenced herein as bins or totes.

Figure 1:
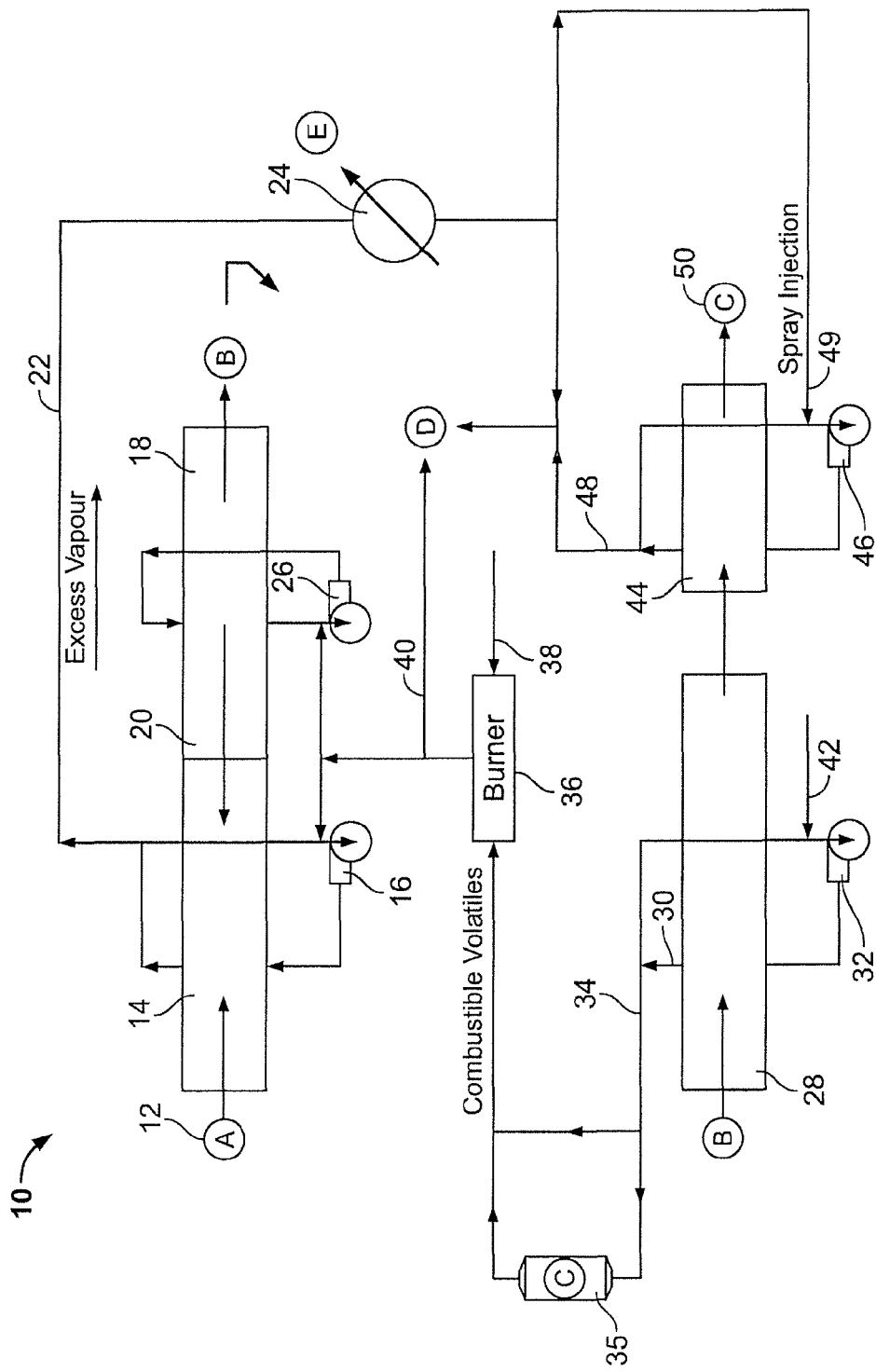
FIG. 1 is a schematic illustration of the heat and mass integration flows for the composite carbonizer circuit.

Referring initially to FIG. 1 as a preliminary overview, shown is a heat and mass integration flow diagram, which generally sets out the operational features of the methodology. The overall process is denoted by numeral 10. Pyrolyzable organic material 12, which for purposes of this description comprises a high carbon content material, is dried in dryer zone 14. Blower 16 is contributory to facilitate in the gaseous penetration/passage interstitially within the feedstock as it is dried. Although not shown, it will be readily apparent to one skilled that agitation or other mixing operations may be included to expedite drying to the state noted supra.

In furtherance of the preparation of the biomass 12 for the carbonization operation, the material is passed into a second dryer zone 18, if required, depending on the nature of the pyrolyzable organic material 12. Excess vapor 20 from the second dryer zone overflows into the first dryer zone and can be recirculated to the first dryer zone for heat economy. The excess vapor in the first dryer zone 22 is passed to heat exchanger 24.

Drying in dryer zone 18 is assisted by blower 26 in the same manner as that discussed regarding dryer zone 14. Once the biomass 12 is sufficiently dry for the carbonization process, it is then passed into the carbonizer, globally denoted with numeral 28. During the process of thermal modification of pyrolyzable organic materials it is well known that there is typically an evolution of volatiles (pyroligneous vapors) 30, liberated from the pyrolyzing organic materials. Blower 32 circulates vapor, containing the volatiles, within the carbonizer 28, with excess vapor containing tars 34 being discharged and, depending upon process, either purified by filtration through biocarbon-containing device 35 or being burned in burner 36. Purification of the excess vapor containing tars by biocarbon product purifies the excess vapor and has the additional advantage of depositing adsorbable tars on the biocarbon product, which increases the yield of biocarbon product and modifies the properties of the biocarbon product in manners that improve its performance in certain applications, such as conversion into high-strength fuel briquettes as a coke replacement. Combustion air can be introduced into the system as required at 38. Excess vapor can be discharged at 40.

Returning to the carbonizer 28, additional thermal energy, when required, may be created within the carbonizer 28 by modulated air admission at 42. This is one possibility; other means, such as direct and indirect heat exchange with the recirculating vapor of the carbonizer 28, will be within the purview of the designer.

Once pyrolysis is complete, the pyrolysed biocarbon is cooled in cooler 44, which is assisted by cooler blower 46. Excess vapor 48 may be discharged. As another possibility, the excess vapor from the dryer may be cooled via heat exchanger 24. The condensed liquid then is useful to act as a heat sink to cool the biocarbon. One implementation of this method would utilize the condensed liquid as a spray introduced at 49. The cooled biocarbon product 50 is then available for further processing or final use.

Figure 2:
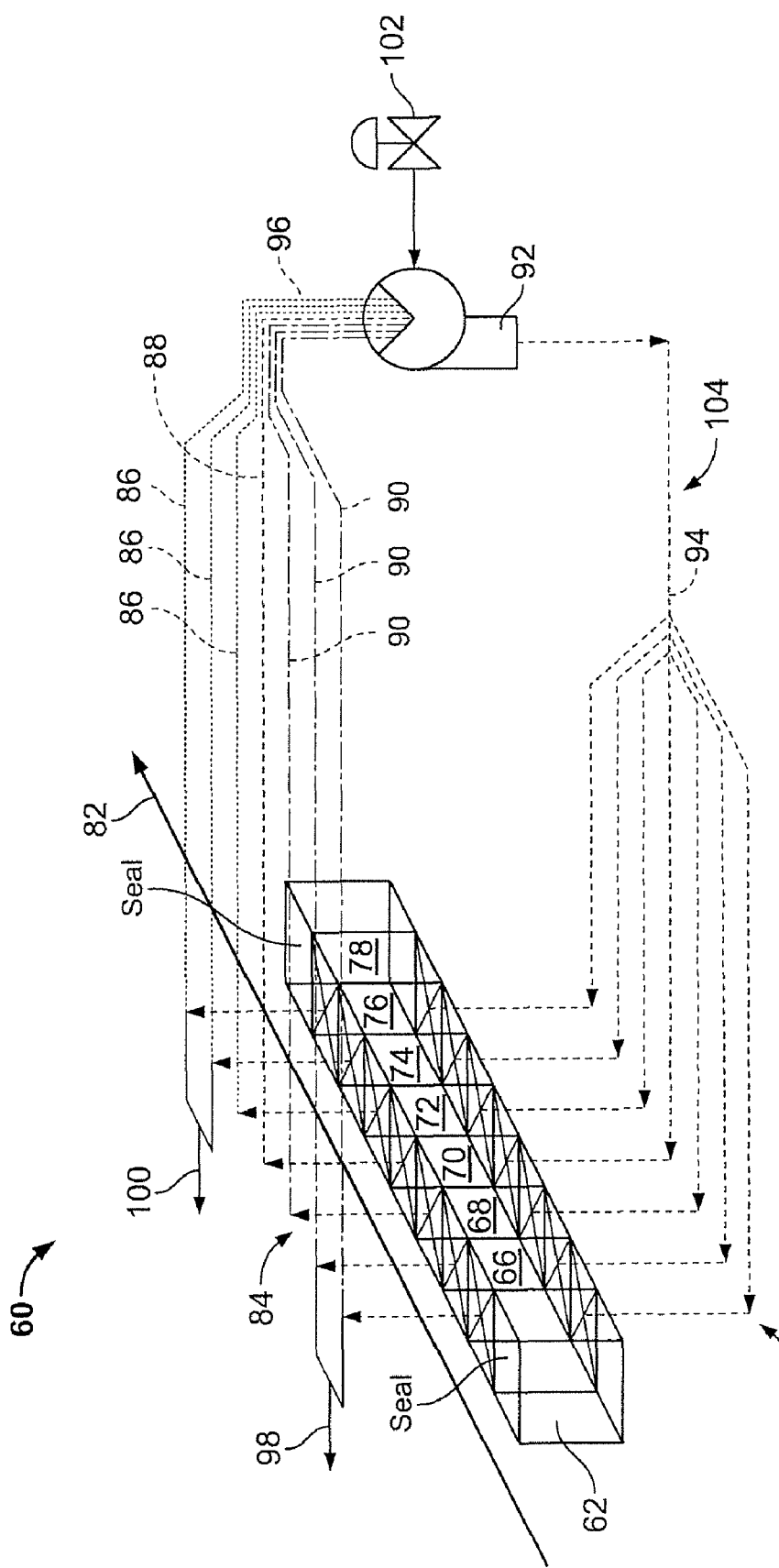
FIG. 2 is a detailed illustration of the solid and vapor flows within the pyrolyzing stage for the implementation featuring a single fully mixed vapor flow.

During the pass through the carbonizer, which houses the pyrolyzing stage, each bin or tote is raised from a starting temperature of less than 100° C. to between 300° C. and 600° C. In the subsequent cooling stage, the carbonized biocarbon is cooled back down to less than 150° C. to allow discharge into the open air without post-combustion. FIG. 2 provides a schematic of the pyrolyzing stage.

Referring now to FIG. 2, shown is a schematic illustration of the overall unit operation sequence, generally denoted by numeral 60. The carbonizer 62 includes a lower section 64 with the cells denoted by numerals 66 through 78. The cells immediately before 66 and after 78 are the entrance and exit points, respectively, indicating the cells which function as seals that separate the carbonizer 62 from the preceding dryer and subsequent cooler operations. Cells 66 through 78 are the heart of the pyrolyzing stage, where the entering pyrolyzable organic materials are elevated in temperature to convert the pyrolyzable organic materials into biocarbon. The pyrolyzable organic materials may be dried in a preconditioning operation, such as the dryer zones shown in the FIG. 1. Understood by one skilled in the art, to this end, any suitable process for drying may be employed and the extent of preferred or necessary drying is dependent on the specific performance objectives of the overall carbonizing process.

The solid material travels in the individual segments, alternately know as bins or totes, which progress in the direction denoted by numeral 82.

As the temperature of the pyrolyzable organic materials increases, the components of the pyrolyzable organic materials, for example, in the case of lignocellulose: hemicellulose, cellulose and lignin, decompose into combustible volatiles, tars and residual biocarbon. The combustible volatiles and tars exit the pyrolyzing organic materials at 84 and depending upon the location of collection, will have different chemical composition and temperature. The various streams are shown as a higher temperature vapor, middle temperature vapor and lower temperature vapor 86, 88 and 90, respectively. The tars and volatiles are recirculated by forced convection in the vapor phase back to the bins (not shown) in cells 66 through 78 by fan 92. Fan 92 is controllable by the user as to the rate of recirculation to the cells 66 through 78. The recirculation loop is denoted by numeral 94. As is illustrated, the streams 86, 88 and 90 are collated within ductwork 96 before passage into fan 92. This configuration is one possible recirculation option that features mechanical simplicity; the user may choose to separately isolate and combine available vapor streams and also change where they are directed to individual cells 66 through 78. This choice will depend on the properties desired in the biocarbon.

The biocarbon (not shown) formed directly from the pyrolyzable organic materials, called "primary charcoal", remains in a respective bin and proceeds to the next cell in accordance with the push rate. The push rate, as discussed in the overview, relates to speed at which the bins or totes are advanced through the carbonizer 62. This rate is controllable by the designer and will be selected depending upon the incoming properties of the pyrolyzable organic material and the desired final properties of the biocarbon.

In general, the lower molecular weight volatiles are stable once formed and remain in the vapor phase until they exit via exhaust 98 and/or 100, but the tars may redeposit on available biocarbon. The tars may either vaporize again or crack into additional volatiles and additional biocarbon, known as "secondary charcoal". Pyrolyzing processes distinguish themselves by their ability to create primary and secondary charcoal, which leads to higher yields of biocarbon from a given incoming weight of pyrolyzable organic materials.

As the vapor phase is recirculated through the bins in cells 66 through 78, make-up air may be introduced at, for example, valve 102 and mixed uniformly as one option supra with all the recirculating vapors by the main fan 92. The ongoing generation of volatiles and oxidation products (water vapor & carbon dioxide) released during the formation of the biocarbon, in addition to any inert and unreacted gases in the make up air, results in the recirculating vapor stream that is constantly increasing in volume. The excess vapor is removed as "exhaust" and directed to a burner (not shown). In the burner, the uncombusted volatiles are oxidized to release the fuel value as heat and purify the exhaust gases. The post-burner gases may be utilized for drying operations (not shown) to condition the incoming pyrolyzable organic feed for thermal modification in the carbonizer.

FIG. 2 depicts an important feature of the carbonizer 62 design, which is the mixing of the vapors from cells 66 through 78, and any make-up air, into a common uniform stream that is returned to the cells in the carbonizer 62 section. By practicing mixture with convective delivery, not only are the constituents of the vapor steams mixed as denoted by numeral 96, but the thermal differences inherent between the vapors exiting cells in the carbonizer 62 are also eliminated. This results in a single uniform stream 104 being returned to the bottoms of the bins located in cells 66 through 78 as shown in FIG. 2. Since the bins heat up as they proceed from cell 66 through cell 78, the three streams 86, 88 and 90 result. Upon mixing, all the vapor streams 86, 88 and 90 returning to the bins are effectively thermally and chemically identical.

As the bins progress through the cells 66 through 78, the pyrolyzable organic materials heat up and pass through the decomposition temperatures for the pyrolyzable components. The preferred cells for the creation of secondary charcoal by tar decomposition are the hottest cells, or cells 76 and 78. The largest generation of tars is associated with the middle cells, such as cells 70, 72 and 74. In order to promote the creation of secondary charcoal, it is necessary to bring the vapor-phase tars into contact with the forming biocarbon, which is precisely the contribution of the main fan recirculation.

Since half the bins have sufficient biocarbon present to facilitate secondary charcoal formation from recirculating tars, the effect of main fan 92 is to increase the number of passes through a biocarbon-containing bins by the vapor phase and the tars therein. The flow rates of the main fan are such that the tars in the recirculating vapor phase passes on average more than 10 times through some bins prior to exiting with the exhaust stream to the burner. As such, the main fan 92 recirculation increases the probability of secondary charcoal formation significantly over the contacting pattern typically present in most pyrolyzers, which provide only a single tar-biocarbon contacting opportunity, that being the interaction with adjacent biocarbon during the initial tar emission from the reacting biomass.

In addition to promoting secondary charcoal formation, the main fan recirculation modulates the temperature in all the cells. The entering bins, in the cooler cells, are heated by the hotter recirculating vapors. The hottest bins, in the later cells, have heat removed by the recirculating vapor phase. As the recycle rate increases, as measured by the relative mass flow rate of vapors in recirculation and solids progressing through the carbonizer in the bins, the effect is to decrease the temperature gradient across the cells 66 through 78. Furthermore, the composite temperature of the recirculating vapor stream may be controlled, either by vapor heat exchange or modulating the amount of make-up air, which controls the total heat release in the carbonizer due to oxidation reactions. Together, the net effect of independently controlled vapor temperature and recirculation rates is to be able to dictate the average temperature and the slope of the temperature gradient within the carbonizer.

The final control variable in the carbonizer is the push rate, which dictates the total time the biomass spends in the carbonizer in cells 66 through 78. Combined with the option of supplemental air addition or heat exchange and the global effects of the main fan recirculation of the vapors between bins in different cells, the carbonizer 62 features superior flexibility and control over the entire pyrolyzable organic materials-to-biocarbon conversion process.

FIG. 2 depicts a carbonizer circuit utilizing seven active bins under pyrolyzing conditions; it is understood that the specific number of bins is not unique and variable with specific requirements of a given application.

Having delineated the nature of the invention, reference will now be made to the data and examples.

EXAMPLE 1

A carbonizer circuit, consisting of a drying stage, pyrolyzing stage and cooling stage, was constructed with the features described in FIG. 1 and FIG. 2. The individual bins were carbon steel boxes 40 centimeters on edge with open tops, screen bottoms and solid walls; each bin contained a nominal 65 liters of entering pyrolyzable organic material. The vapors within the carbonizer were extracted from a common plenum above all bins with a single extraction point from the common plenum above bin position 76 on FIG. 2 and returned to a common plenum under all bins with the specific return points to the common plenum being under bin position 74 and 78 on FIG. 2.

The carbonizer main fan was a large squirrel cage fan, with nominally 45-degree outward forcing fan blades. The rotating squirrel cage was 60 centimeter ID, 70 centimeter OD and 20 centimeters high. The main fan rotated at 450 rpm when driven at 60 hertz by the variable frequency drive (VFD) of the main fan. The other blowers for the drying stage and cooling stage were radial flow blowers of appropriate sizes to accomplish the necessary drying and cooling duties.

The carbonizer circuit processed undried SPF (spruce-pine-fir) wood chips, nominally 1 to 20 centimeters in all dimensions, known in the forestry industry as "hog fuel", at push rates between 8 and 20 minutes and carbonizer main fan operating at frequencies between 25 hertz and 70 hertz. The entering SPF wood chips contained between 15% and 67% moisture content and were routinely dried prior to entering the pyrolyzing stage to less that 15% moisture content. The dried biomass is carbonized in the pyrolyzing stage at a temperature measured within the higher temperature vapors 86 and controlled to between 325 C and 450 C by the addition of metered air prior to the carbonizer main fan. Following the pyrolyzing stage, the hot biocarbon product was cooled sufficiently to allow discharge into ambient air without any post-combustion phenomena. The carbonizer circuit produced a high quality biocarbon under the entire variety of processing conditions.

EXAMPLE 2

SPF wood chips were processed by the carbonizer circuit of Example 1 with the higher temperature vapors setpoint of 350 C, as controlled by the addition of metered air prior to the carbonizer main fan. The carbonizer main fan was operated at frequencies of 30 hertz, 50 hertz and 70 hertz on the variable frequency drive (VFD) of the main fan. The push rate was typically 15 minutes, although 20 minute push intervals were used on occasion at 30 hertz to facilitate necessary heat transfer to the entering bins.

The pyrolyzing stage demonstrated improving heat exchange between the bins with increasing fan speed, as evidenced by an accelerated heating of cooler entering bins and decreased temperature gradient within the higher temperature bins. Furthermore, the yield of biocarbon product per unit of entering dry biomass increased with increasing fan speed, as measured by weighing dried coupons of wood blocks before and after carbonization. The calculated yields on a weight basis were 28 percent at 30 hertz, 33 percent at 50 hertz and 38 percent at 70 hertz on the variable frequency drive (VFD) of the main fan.

Additionally, the native adsorption capacity of biocarbon product increased with decreasing fan speed, as measured by comparing the adsorption properties of the biocarbon to reference activated carbon products, with the 30 hertz biocarbon product evidencing 60 percent higher adsorption capacity for R134a at 100 Celsius than the analogous 70 hertz biocarbon. A further effect of increasing fan speed, as measured by the VFD hertz, was the volatile matter content of the biocarbon product. The volatile matter content of the 70 hertz biocarbon product was over 20 percent higher than the volatile matter level measured in the 30 hertz biocarbon product. The trends in yield, adsorption capacity and volatile matter content are all consistent with the mechanism of higher fan recirculation rates promoting additional secondary charcoal formation, thereby increasing yield, consuming adsorption capacity and introducing additional volatile matter in the biocarbon product.

EXAMPLE 3

SPF wood chips were processed by the carbonizer circuit of Example 1 at higher temperature vapors setpoints over the range of 350 C to 425 C, as controlled by the addition of metered air prior to the carbonizer main fan. The carbonizer main fan was operated at a fixed frequency of 70 hertz on the variable frequency drive (VFD) of the main fan. The push rate was varied between runs at 15-minute push intervals and runs at 20-minute push intervals and the effect on adsorption capacity and volatile matter measured.

Independent of the higher temperature vapors setpoint over the range of 350 C to 425 C, the adsorption capacity was at least 40 percent higher in the biocarbon products produced at 20-minute push intervals as compared to the biocarbon products produced at 15-minute push intervals. In addition, the 15-minute push interval biocarbon product evidenced approximately 10 percent higher volatile matter content than the 20-minute push interval biocarbon product.

EXAMPLE 4

While processing SPF wood chips by the carbonizer circuit of Example 1 with the higher temperature vapors setpoint of 425 C and the carbonizer main fan operating at 40 hertz, discrete individual bins of a representative grass material, in this case dried straw, were introduced into the sequence of SPF bins being processed in the Carbonizer. The dried straw converted to carbonized biocarbon product with measurably different properties than the concurrently produced SPF-derived biocarbon. For example, the straw-derived biocarbon product evidenced an adsorption capacity between one half and two thirds of the adjacent SPF biocarbon material, while exhibiting approximately the same level of volatile matter. It is further anticipated, under the processing conditions utilized with the carbonizer, that the straw-derived biocarbon would retain a significant portion of the entering potassium and phosphorus nutrients present in the incoming straw.

This example demonstrates a valuable versatility in the current invention, where combinations of different biomass may be co-processed at the same time. The benefit of the current invention is to separately carbonize both materials, although it is likely that some cross deposition of secondary charcoal is occurring from one biomass to the other carbonizing biomass. This method can further be applied by providing combinations of differing biomass within each bin, either layered or mixed, with the resultant blending of the vapors and combining of secondary charcoal formation processes. A further variation of this technique is to introduce finished biocarbon products for additional passes through the carbonizer, thereby providing additional opportunities for secondary charcoal formation. This recycled material could be processed either as discrete bins or within heterogeneous bins as layers or intimately mixed.

EXAMPLE 5

Finished biocarbon was used to purify the excess vapor containing tars, as depicted in FIG. 1 as excess vapor containing tars 34 and purified by filtration through biocarbon-containing device 35. The finished biocarbon weight increased approximately 20 percent during a two-hour period of moderate purging with excess vapor containing tars. Another sample of biocarbon was similarly treated with excess vapor containing tars and the biocarbon samples, before and after treatment, were tested for physical properties.

The original biocarbon product, prior to use as a filtration media for the excess vapor containing tars, had a volatile matter content of 14 percent by weight and an adsorption capacity of over 7 weight percent R134a uptake at 100 Celsius. After loading with excess vapor containing tars, as depicted in FIG. 1 in device 35, the biocarbon product was removed and the biocarbon product tested. Two samples of the biocarbon product, representing material at the entrance of the device 35 and representing material at the exit of the device 35, were tested for volatile matter and adsorption capacity. Both samples had a volatile matter content of over 20 percent by weight and an adsorption capacity of less than 3 weight percent R134a uptake at 100 Celsius, although the two samples had measurably different levels of volatile matter and adsorption capacity. Thus, the effect of using the biocarbon product as a filtration media is to modify both the volatile matter content and adsorption capacities of the biocarbon product, which can be further controlled by the features of the biocarbon-containing device 35 and the conditions of the filtration of the excess vapors containing tars.

EXAMPLE 6

In order to demonstrate the differences in the current carbonization technology and other advanced carbonization technologies, such as those detailed in U.S. Pat. No. 5,435,983, issued Jul. 25, 1995, to Antal, and Antal's later patent, U.S. Pat. No. 6,790,317, issued Sep. 14, 2004, a sample of Utah Juniper wood was carbonized by both Antal's "Flash Carbonization" method and in the current invention under the conditions described in Example 1.

The "Flash Carbonization" biocarbon product was low in volatile matter, but also quite low in adsorption capacity. One sample of biocarbon product, produced at a higher temperature vapors setpoint below 400 C evidenced adsorption capacity approximately 75 percent greater than the "Flash Carbonization" biocarbon product. A second sample of biocarbon product, produced at a higher temperature vapors setpoint above 400 C evidenced adsorption capacity approximately 150 percent greater than the "Flash Carbonization" biocarbon product. Both samples of biocarbon product produced by the current invention evidenced higher levels of volatile matter than the "Flash Carbonization" material.

Although embodiments of the invention have been described above, it is not limited thereto and it will be apparent to those skilled in the art that numerous modifications form part of the present invention insofar as they do not depart from the spirit, nature and scope of the claimed and described invention.

We claim:

1. A method for combining drying and cooling operations with thermal energy recovery in a pyrolyzing process, comprising the steps of:
providing a carbonizer circuit having a drying stage, pyrolyzing stage and cooling stage, said pyrolyzing stage including:
pyrolyzing organic materials to generate biocarbon and exhaust gas containing combustible volatiles and tars;
combining at least a portion of said exhaust gas with air to form a combustible mixture;
igniting said mixture to form a purified hot gas stream;
said drying stage including:
circulating at least a portion of said purified hot gas stream into direct contact with said entering pyrolyzable organic materials to augment drying of said pyrolyzable organic materials and generating a high humidity dryer exhaust stream;
condensing a portion of said high humidity dryer exhaust stream by heat removal;
said cooling stage including:
providing condensate from the dryer stage to the cooling stage; and
introducing said condensate into the cooling stage in a manner to cool hot biocarbon sufficiently to allow safe discharge from said carbonizer circuit.

2. The method as set forth in claim 1, further including the step of selectively controlling the rate of circulation in said carbonizer circuit.

3. The method as set forth in claim 1, further including the step of selectively controlling the introduction of make-up air into said combustible mixture to control thermal energy generation within said carbonizer circuit.

4. The method as set forth in claim 1, further including the step of employing liberated heat from the heat of reaction from the oxidation of biocarbon with said make-up air in said carbonizer circuit to heat incoming segments and cool hotter exiting segments, thereby providing controlled carbonization of pyrolyzable organic materials contained therein.

5. The method as set forth in claim 1, further including the step of selectively varying the rate of advancement of said pyrolyzable organic materials through said carbonizer circuit.

6. A method of forming a pyrolysed biocarbon, comprising:
providing a carbonizer circuit for thermal modification of pyrolyzable organic materials, said carbonizer circuit having a pyrolyzing stage therein;
pyrolyzing advancing predetermined feedstock segments where a gradient of pyrolyzing feedstock is generated and liberates a vapor mixture containing at least combustible volatiles and tars; and
recirculating, in said pyrolyzing stage, said vapor mixture at predetermined feedstock segments within the pyrolyzing stage for at least one of thermal energy exchange and formation of secondary charcoal from said vapor mixture to said predetermined segments.

7. The method as set forth in claim 6, wherein said vapor mixture released from each said segment has a different composition of volatiles.

8. The method as set forth in claim 6, further including the step of selectively recovering said volatiles released at a segment.

9. The method as set forth in claim 6, wherein said recirculating is forced convective recirculation.

10. The method as set forth in claim 6, wherein pyrolyzed biocarbon comprises primary char.

11. The method as set forth in claim 6, further including the step of selectively injecting recovered volatiles at a segment for affecting the composition of formed biocarbon.

12. A method of forming a homogenous pyrolyzed product, comprising:
providing a carbonizer circuit for thermal modification of pyrolyzable organic materials, said carbonizer circuit having a pyrolyzing stage therein for transforming the entering pyrolyzable organic materials into thermally modified biocarbon;
advancing dried feedstock in individual segments through said pyrolyzing stage;
thermally modifying advancing dried feedstock segments where a gradient of pyrolysed feedstock is generated from said individual segments, each segment having a discrete vapor mixture containing at least volatiles and tars, each said discrete vapor mixture having a discrete temperature range;
collating each said vapor mixture into one or more vapor mixtures;
providing thermal control of the collated vapor mixtures to form uniform streams at desired temperatures by heat exchange or selectively introducing air into said vapor mixtures to facilitate oxidation of at least some of the advancing feedstock and concurrent generation of heat therein;
recirculating, in said pyrolyzing stage, said uniform stream at predetermined feedstock segments within said carbonizer circuit for exposure to said predetermined segments, whereby each said predetermined segment is exposed to said uniform stream to form a homogeneous product.

13. The method as set forth in claim 12, wherein said gradient comprises a progression of said feedstock through to pyrolysed biocarbon.

14. The method as set forth in claim 12, wherein said recirculating is forced convective recirculation.

15. The method as set forth in claim 12, wherein said pyrolysed biocarbon comprises primary char.

16. The method as set forth in claim 12, wherein said recirculating induces the formation of secondary biocarbon within said primary biocarbon.

17. The method as set forth in claim 12, further including the step of selectively controlling residency time of each segment in said carbonizer circuit.

18. The method as set forth in claim 12, further including the step of selectively controlling the rate of recirculation in said carbonizer circuit.

19. The method as set forth in claim 12, further including the step of selectively controlling the introduction of make-up air into said mixture to control thermal energy generation within said carbonizer circuit.

20. The method as set forth in claim 12, further including the step of employing liberated heat from the heat of reaction from the oxidation of vapors and biocarbon with said make-up air in said pyrolyzing stage to heat incoming segments and effect controlled thermal modification of pyrolyzable organic materials contained therein.

* * * * *